(12) United States Patent
Yu et al.

(10) Patent No.: US 8,873,970 B2
(45) Date of Patent: Oct. 28, 2014

(54) GENERATING A 400-GBIT/S SINGLE-CHANNEL OPTICAL SIGNAL

(75) Inventors: Jianjun Yu, Princeton, NJ (US); Dayou Qian, Warren, NJ (US); Philip Nan Ji, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 369 days.

(21) Appl. No.: 12/789,943

(22) Filed: May 28, 2010

(65) Prior Publication Data

US 2011/0020003 A1 Jan. 27, 2011

Related U.S. Application Data

(60) Provisional application No. 61/183,305, filed on Jun. 2, 2009.

(51) Int. Cl.

| H04B 10/04 | (2006.01) |
| H04B 10/12 | (2006.01) |
| H04B 10/548 | (2013.01) |
| H04J 14/06 | (2006.01) |

(52) U.S. Cl.
CPC ............... *H04B 10/548* (2013.01); *H04J 14/06* (2013.01)
USPC ........... 398/183; 398/185; 398/186; 398/192; 398/193; 398/196

(58) Field of Classification Search
USPC .................. 398/183, 185, 186, 192, 193, 196
See application file for complete search history.

(56) References Cited

U.S. PATENT DOCUMENTS

| 6,972,842 B2 * | 12/2005 | Doerr et al. .................... 356/364 |
| 7,190,855 B2 * | 3/2007 | Han et al. ......................... 385/24 |
| 7,606,501 B2 * | 10/2009 | Bai .............................. 398/183 |
| 8,072,669 B2 * | 12/2011 | Zhou ............................ 359/238 |
| 8,131,156 B2 * | 3/2012 | Yu ................................ 398/168 |
| 2004/0197041 A1 * | 10/2004 | Lu et al. ............................ 385/3 |
| 2012/0082465 A1 * | 4/2012 | Akiyama et al. .............. 398/158 |

* cited by examiner

*Primary Examiner* — Dalzid Singh
(74) *Attorney, Agent, or Firm* — Joseph Kolodka

(57) ABSTRACT

A method for generating a 400 Gb/s single channel optical signal from multiple modulated subchannels includes carving respective modulated subchannels into return-to-zero RZ modulated subchannels having non-overlapping peaks with intensity modulators having a duty cycle less than 50%, and combining the subchannels into a single channel signal aggregating the bit rate of each of the subchannels. The subchannels are combined with a flat top optical component for increased subsequent receiver sensitivity.

5 Claims, 1 Drawing Sheet

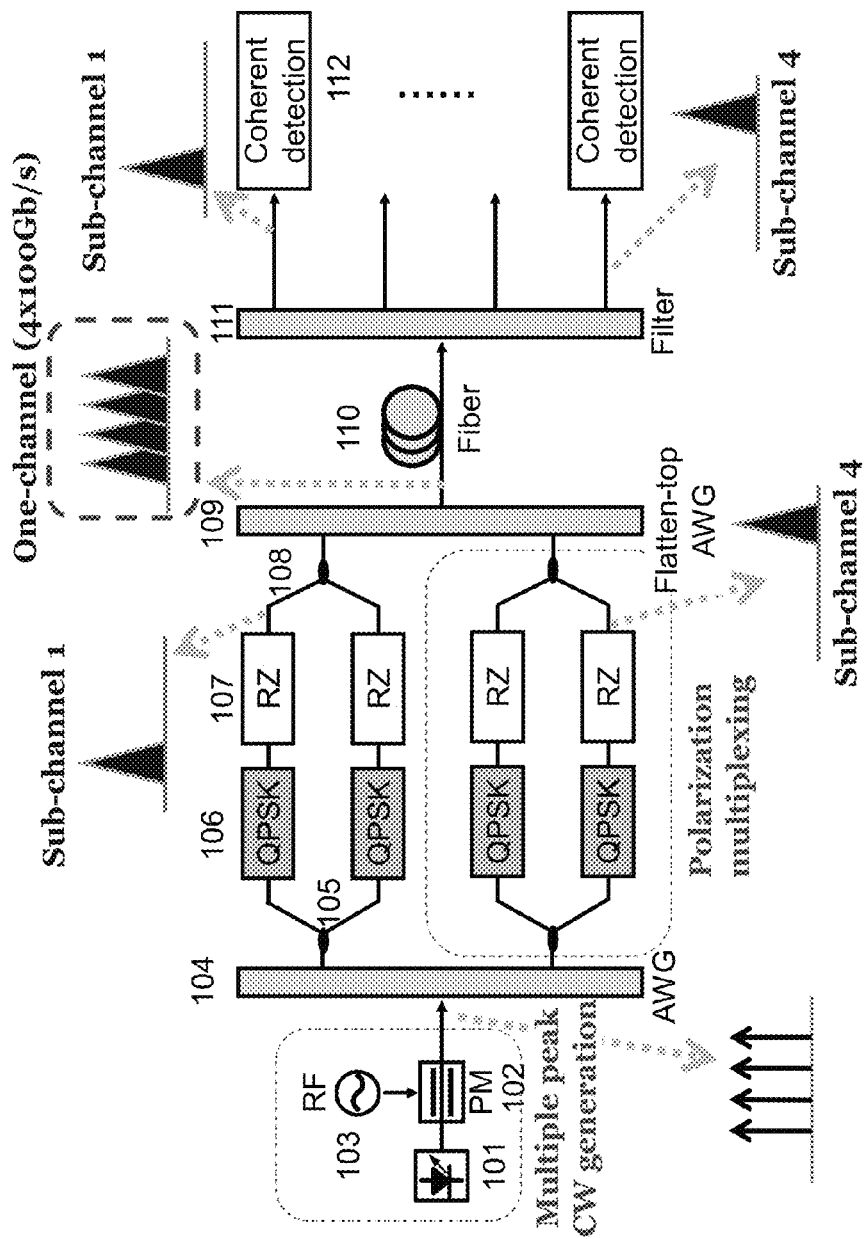

GENERATING A 400-GBIT/S SINGLE-CHANNEL OPTICAL SIGNAL

CROSS-REFERENCE TO RELATED APPLICATIONS

This application claims the benefit of U.S. Provisional Application No. 61/183,305 filed on Jun. 2, 2009, the contents of which is hereby incorporated by reference.

BACKGROUND OF THE INVENTION

The invention relates to optical communication, and, more particularly, to generation and coherent detection of 400-Gb/s single-channel optical signal.

It is anticipated that a 400 Gb/s (Gigabit per second) per channel is a possible bit rate for long-haul (LH) optical transmissions, after 100 GbE (Gigabit Ethernet). In recent years, a lot of exciting results on 100 GbE LH optical transmissions have been achieved. However, there is no experimental demonstration of 400 Gb/s single-channel optical signal transmission. To generate a single carrier 400-Gb/s optical signal, even if polarization diversity (PD) and 16QAM modulation format are employed, the baud rate per carrier still goes up to 50 Gig baud/s, with no consideration to forward error correction FEC. The bandwidth of an analog-to-digital converter (ADC) chip at this rate is not available in the near future. Also, the transmission distance of this single carrier is short due to high optical signal-to-noise ratio (OSNR) requirements. To use multiple peaks or multiple subchannels to transmit a high-bit rate is a good solution to reduce the baud rate and extend the transmission distance. A 100-Gb/s transmitter with two peaks to tolerant large polarization mode dispersion and fiber dispersion has been demonstrated. Recently, a 100-Gb/s signal with a spectral efficiency of 2 b/Hz/s over 6000 km, with two peaks of an optical OFDM signal and Raman amplification, was demonstrated. It has also been demonstrated that a 100-Gb/s PD-RZ-QPSK (polarization diversity- return-to-zero-quadtrature phase shift keying) signal has good receiver performance at 25-GHz channel spacing. However, all of these 100-Gb/s demonstrations fall short of the capacity that a 400-Gb/s single channel system could achieve.

It is advantageous to further improve the design of optical communication with the

SUMMARY OF INVENTION

A method for generating a 400 Gb/s single channel optical signal from multiple modulated subchannels includes carving respective modulated subchannels into return-to-zero RZ modulated subchannels having non-overlapping peaks with respective intensity modulators having a duty cycle less than 50%, and combining the subchannels into a single channel signal aggregating the bit rate of each of the subchannels with an optical component being a flat top optical component for increased subsequent receiver sensitivity.

In an alternative aspect of the invention, a method for generating a 400 Gb/s single channel optical signal from multiple subchannels includes generating multiple peaks from a continuous lightwave source with a modulator driven by a radio frequency; with modulation format modulators responsive to the multiple peaks, generating modulated respective non-return-to-zero NRZ subchannels, with respective intensity modulators, carving the modulated NRZ subchannels to return-to-zero RZ subchannels, the intensity modulators having a duty cycle less than 50% for enabling the subchannels with non-overlapping peaks for improved filtering, and with an optical component, combining the subchannels into a single channel signal aggregating the bit rate of each of the subchannels, the optical component being a flat top optical component for increased subsequent receiver sensitivity.

These and other advantages of the invention will be apparent to those of ordinary skill in the art by reference to the following detailed description and the accompanying drawings.

BRIEF DESCRIPTION OF DRAWINGS

FIG. 1 is a block diagram of 400-Gb/s PD-RZ-QPSK signal generation and detection, in accordance with the invention.

DETAILED DESCRIPTION

The present invention is directed to generation of a 400-Gb/s PD-RZ-QPSK signal with four-subchannels and spectral efficiency up to 3.7 b/Hz/s after removing 7% forward error correction FEC overhead. In the inventive transmitter, the 400-Gb/s signal is carried by four subchannels with a channel spacing of 25 GHz, where each subchannel carrier is a 100-Gb/s PD-RZ-QPSK signal.

FIG. 1 shows the configuration of 400-Gb/s signal generation and detection, in accordance with the invention. A single-mode continuous wave CW lightwave (101) is modulated by a phase modulator (PM) (102) driven by a sinusoidal radio frequency RF source (103) with a repetitive frequency of $f$. With a proper driving voltage on the PM 102, a CW lightwave carried by multiple subchannels or peaks is generated in a fixed frequency spacing and equal amplitude, as depicted by the pulse train below the multiple peak CW generation section to the left in FIG. 1. However, another method to generate multiple-peak CW lightwave is using an intensity modulator (IM) and different frequency RF signals. For a 400-Gb/s transmitter, if each subchannel carries over 100-Gb/s signal, then four peaks are needed. The four peaks are separated into four lightwaves by an array waveguide grating (AWG) or a Dense Wavelength Division Multiplexing (DWDM) filter (104).

Each lightwave is modulated individually by a quadrature phase shift keying (QPSK) modulator (106) and polarization multiplexing scheme to generate a polarization diversity optical signal. In order to improve filtering, a return-to-zero RZ shape filter with a small duty cycle after a pulse carving modulator (107) can be employed. The node connector 105 is a polarization maintaining optical coupler. The node connector 108 is a polarization beam combiner. Among the available modulated signals, such as QPSK, 8PSK, 16QAM (quadrature amplitude modulation) and higher level modulation formats, QPSK is used because of its simple configuration and high receiver sensitivity. The generated subchannels are combined by an optical component (109), for instance, an optical coupler, a DWDM filter, or AWG. Here a flat top optical component is optimal.

The sub-channels are combined and transmitted over fiber (110) to the receiver. For DWDM system, all 400-Gb/s channels can be combined by another AWG. At the receiver, the four subchannels are demulitplexed before each subchannel is detected. An optical filter or an AWG (111) is used to separate the four subchannels. Each subchannel can be detected by coherent detection (112).

The continuous wave light 101 is preferably a DFB-LD laser source with a usually wide linewidth. For 100 Gbit/sec QPSK, the linewidth can be smaller than 2MHz. Alternatively, the laser source can be a tunable external laser with a narrow line width and low phase noise and preferred for high level modulation format signals.

The multiple peaks generated by the phase modulator PM 102, can be generated alternatively by an intensity modulator or by a cascaded intensity modulator and phase modulator. The phase modulator has better stability due to no DC bias control and it has a low insertion loss.

The RF signal 103 is used to drive the phase modulator 102. The optical signal with multiple peaks is generated after the modulator. The peaks have a frequency spacing equal to the repetitive frequency of the RF signal.

The optical filter 104 used to separate the four peaks can be an array waveguide grating AWG, as shown, or a DWDM filter or other optical filter.

The QPSK modulators 106 for generating a nonreturn-to-zero signal can be cascaded modulators in a serial configuration or parallel configuration. Other modulation format modulators ca also be sued such as 8PSK, 8QAM or other high level modulation format.

The intensity modulator 107 is driven by a clock signal to carve the pulse to return-to-zero. A different duty cycle can be realized by changing the driven amplitude of the clock source or the dc bias on the modulator. In the present invention, the duty cycle should be smaller than 50% with the optimal duty cycle being around 40%.

The optical coupler 105 at the node to the QPSK modulators is used for separating the one lightwave into two lightwaves. A polarization maintaining at 50:50% optical coupler is optimal.

The optical coupler at the node from the intensity modulators 107 is used to combine the two lightwaves to have orthogonal polarization direction to a polarization multiplexing optical signal.

The optical combiner 109 is used to combine four (4) subchannels. It can be an optical coupler, a DWDM filter or an AWG. Here the flat top optical component is optimal. When a flat top AWG is used, the receiver sensitivity will be high.

The transmission fiber 110 can be any transmission fiber such as a standard single mode fiber, LEAF, or other fiber. In order to compensate for any transmission loss in the fiber optical amplifiers, optical amplifiers can be used.

The optical filter 111 used to separate the four (4) subchannels can be an optical coupler, DWDM filter or AWG. Here a flat top optical component is optimal. When a flat top AWG is used, the receiver sensitivity will be high.

The digital coherent detection 112 is a regular digital coherent detection.

While an exemplary drawing and specific embodiment of the present invention has been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method for generating a 400 Gb/s single channel optical signal from multiple subchannels comprising the steps of:
    with a modulator driven by a radio frequency, generating multiple peaks from a continuous lightwave source;
    with modulation format modulators responsive to said multiple peaks, generating modulated respective non-return-to-zero NRZ subchannels;
    with respective intensity modulators, carving the modulated NRZ subchannels to return-to-zero RZ subchannels, said intensity modulators having a duty cycle less than 50%, with an optimal said duty cycle being proximate 40%, for enabling said subchannels with non-overlapping peaks for improved filtering; and
    with an optical component, combining said subchannels into a single channel signal aggregating the bit rate of each of the subchannels, said optical component being a flat top optical component for increased subsequent receiver sensitivity.

2. The method of claim 1, wherein wherein said duty cycle is about 40%.

3. The method of claim 2, wherein said optical component comprises a dense wavelength division multiplexing DWDM filter.

4. The method of claim 1, wherein said optical component comprises an optical coupler.

5. The method of claim 1, wherein said optical component comprises an array waveguide grating AWG.

* * * * *